United States Patent [19]

Granryd

[11] 4,402,357
[45] Sep. 6, 1983

[54] LIGHTWEIGHT TRACTION INTENSIFYING MEANS FOR AGRICULTURAL WHEELED TRACTORS AND THE LIKE

[76] Inventor: Thorvald G. Granryd, P.O. Box 258, Lake Forest, Ill. 60045

[21] Appl. No.: 322,115

[22] Filed: Nov. 17, 1981

[51] Int. Cl.³ .................. B60C 27/00; B60C 27/20
[52] U.S. Cl. ..................... 152/216; 152/225 R; 152/227; 152/241; 152/218; 152/222
[58] Field of Search ............ 152/213 A, 213 R, 214, 152/216, 218, 225 R, 226, 239, 241, 222, 227–229

[56] References Cited

U.S. PATENT DOCUMENTS

| | | | |
|---|---|---|---|
| 901,842 | 10/1908 | Shattuck | 152/227 |
| 1,095,451 | 5/1914 | Clark | 152/227 |
| 1,228,619 | 6/1917 | Tilgner | 152/226 |
| 1,578,071 | 3/1926 | Cadieux | 152/227 |
| 2,440,632 | 4/1948 | Hack | 152/225 R |
| 2,739,633 | 3/1956 | LaVigueur | 152/222 |
| 2,808,868 | 10/1957 | Bryan | 152/228 |
| 3,028,901 | 4/1962 | Batori | 152/239 |
| 3,893,497 | 7/1975 | Vagias | 152/213 A |
| 4,098,313 | 7/1978 | Ingerson | 152/213 R |
| 4,224,972 | 9/1980 | Granryd | 152/213 A |
| 4,235,272 | 11/1980 | Landsraff | 152/213 R |
| 4,278,122 | 7/1981 | Vagias | 152/226 |

FOREIGN PATENT DOCUMENTS

| | | | |
|---|---|---|---|
| 1505103 | 2/1969 | Fed. Rep. of Germany | 152/226 |
| 1903666 | 8/1970 | Fed. Rep. of Germany | 152/222 |

Primary Examiner—Edward C. Kimlin
Assistant Examiner—F. K. Wine
Attorney, Agent, or Firm—August E. Roehrig, Jr.

[57] ABSTRACT

A lightweight device for obtaining improved traction efficiency of rubber tired vehicles without adding ballast weight. The device has resilient traction intensifying means secured to a driving tire, including auxiliary means for utilizing stronger sub-surface soil, providing higher drawbar pull at a higher rate of travel speed; and means for convenient attachment and removal.

7 Claims, 14 Drawing Figures

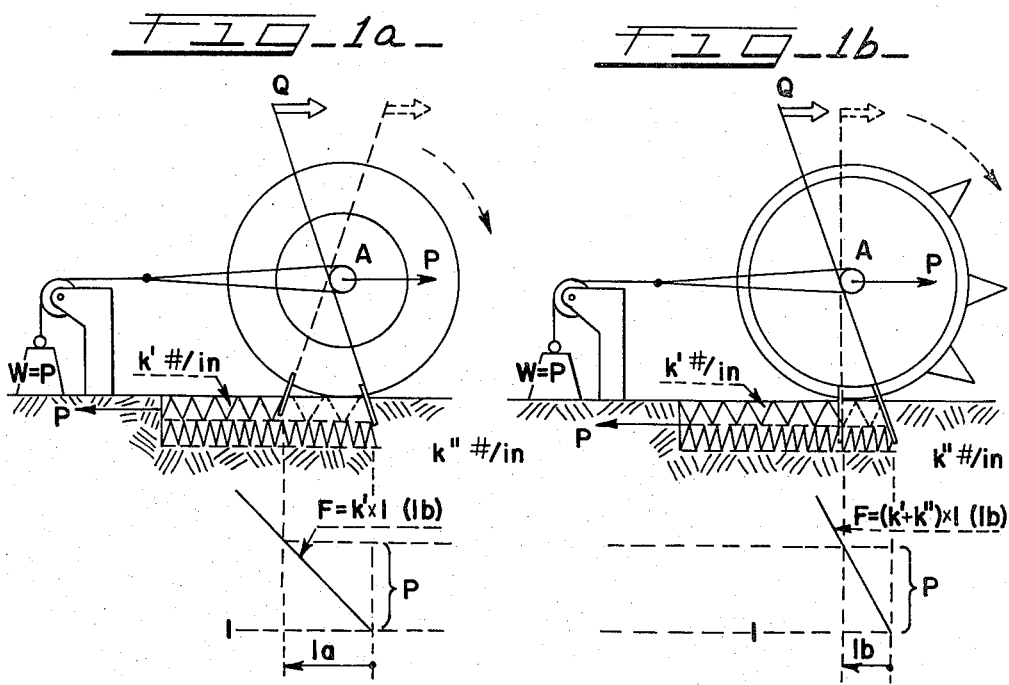
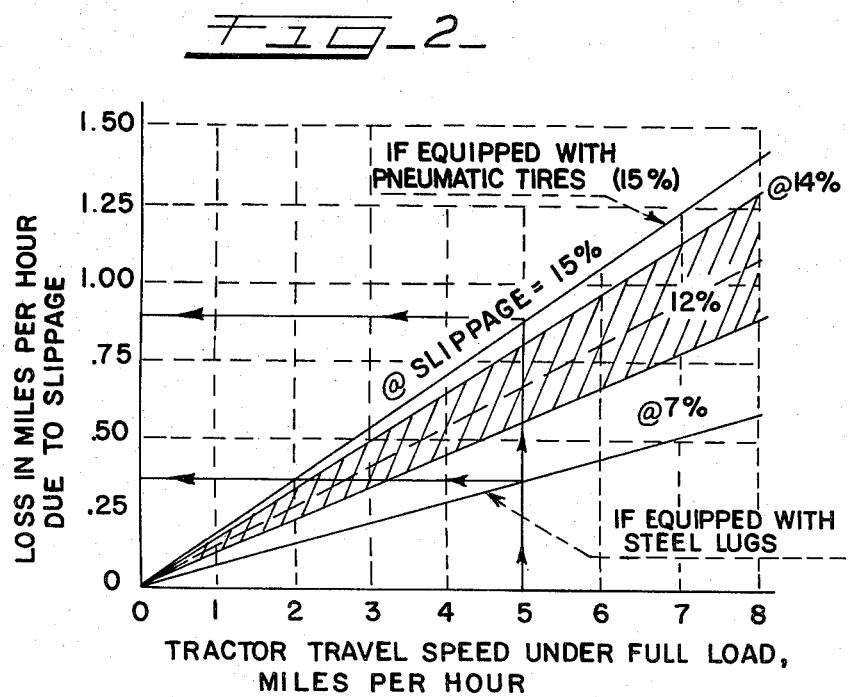

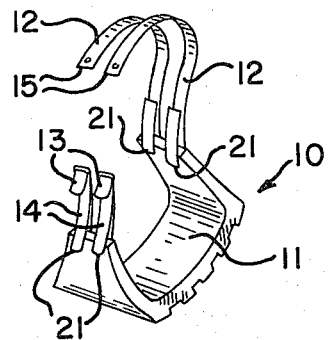
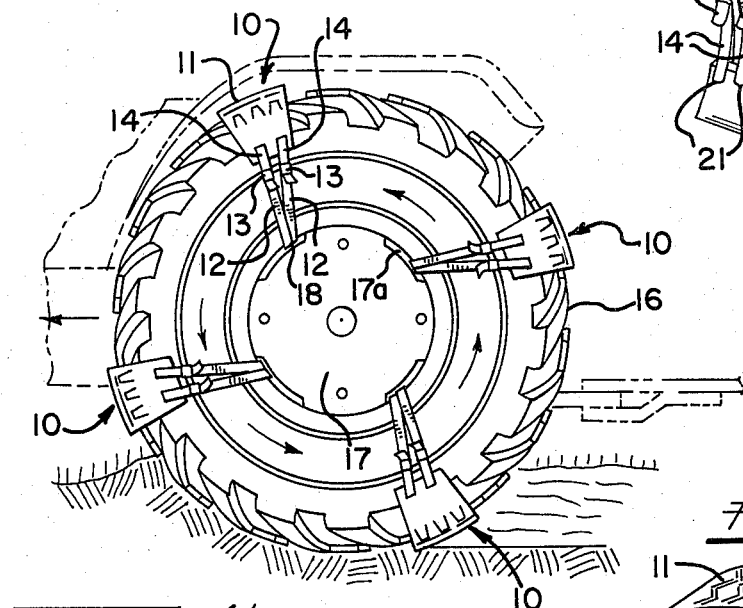
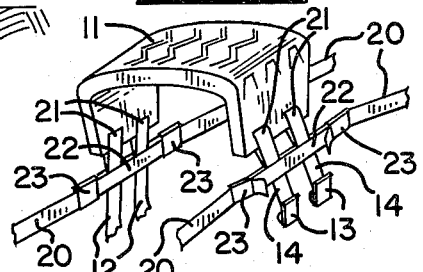
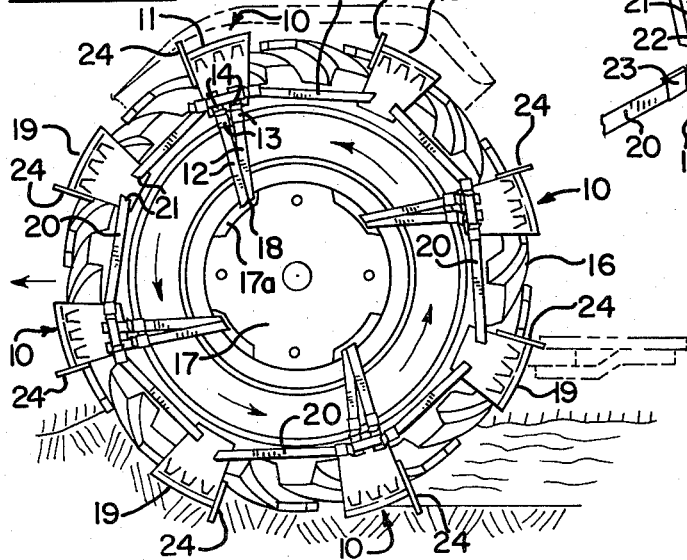
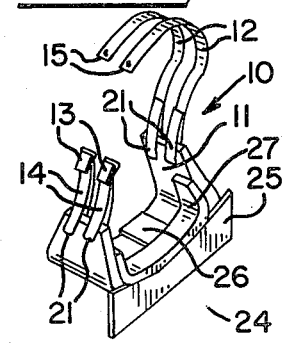

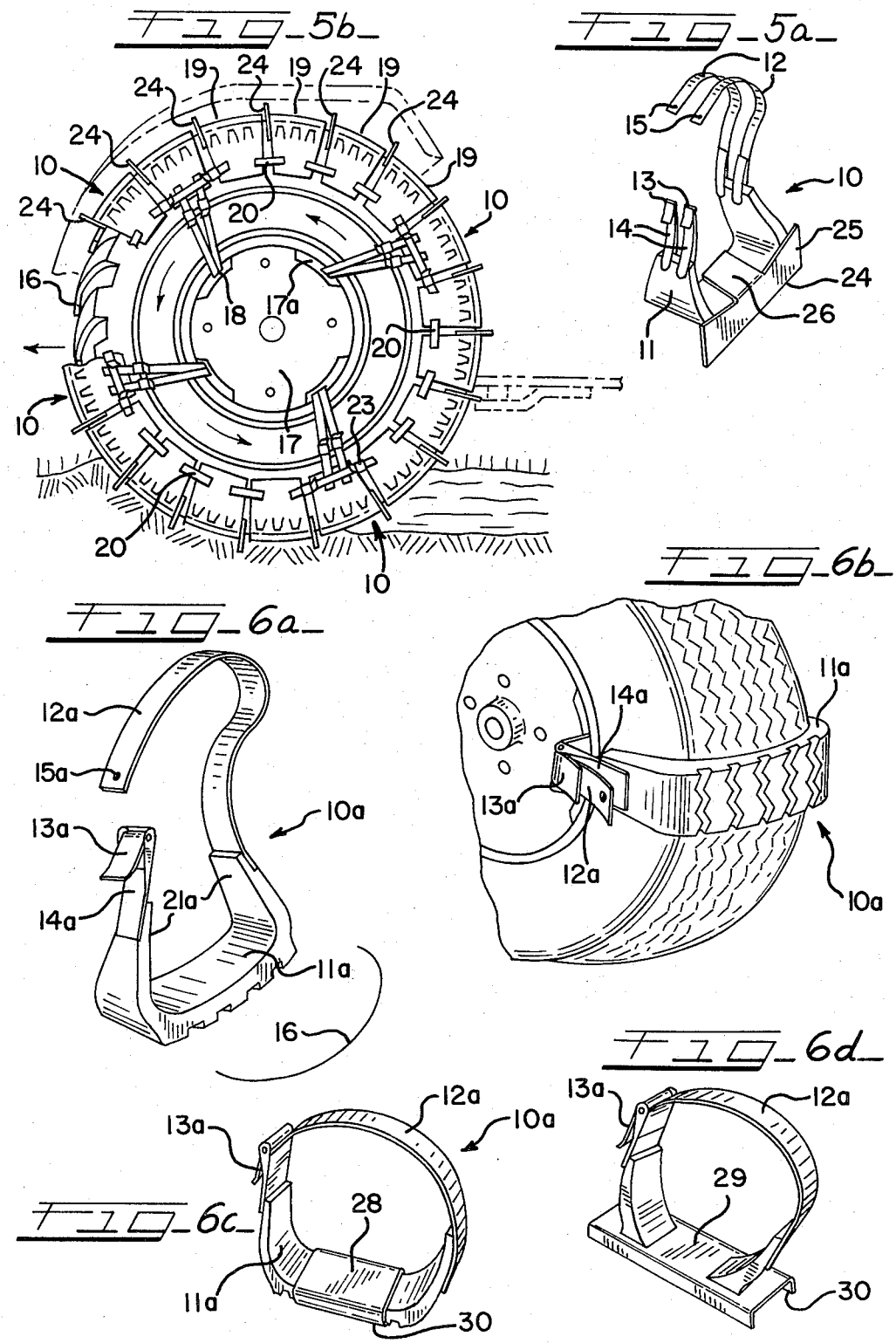

LIGHTWEIGHT TRACTION INTENSIFYING MEANS FOR AGRICULTURAL WHEELED TRACTORS AND THE LIKE

BACKGROUND OF THE INVENTION

This invention relates generally to an apparatus and method for improving traction efficiency on rubber tired vehicles and reference is made to U.S. Pat. No. 4,224,972 the disclosure of which is incorporated herein by reference. The invention disclosed in this patent is expanded upon and its application on agricultural wheeled tractors is shown.

Agricultural equipment has been plagued with traction problems since the pneumatic tire replaced steel wheels in the 1930's. To alleviate this problem, adding ballast the drive wheels has been the accepted method for several decades, either in the form of auxiliary wheel weight, or liquid or dry ballast within the driving tires.

Since a typical tractor operates with many thousand pounds of ballast, improved traction is obtained at the expense of some 300 gallons of fuel annually to provide for hauling "ballast-power". In terms of energy, a staggering 40 trillion BTUs is consumed by each million farm tractors every year for the sole purpose of providing added traction ability. Furthermore, and equally significant, adding weight is only a half measure because in order for a pneumatic tire to be effective, it must operate at a considerable rate of slippage in order for the soil to build up thrust for propulsion, because a typical tire is sensitive to surface soil only.

This set of circumstances is in sharp contrast to characteristics exhibited by earlier tractors, having steel-lugged wheels. The steel-lugs not only penetrate into the stronger sub-surface soil layer without weight-adding, but are also capable of transmitting propulsion power at a much lower rate of slippage. As a result, if the same million of today's farm tractors were equipped with steel wheels, they would travel a distance of some 250 million miles further each year at the same number of wheel revolutions.

For example, in the 1910's Harry G. Ferguson observed that steel wheel tractors had such a pronounced over abundance of traction ability, that they were unsafe to the operation. If the implement met an obstacle, and the operator was not careful, the tractor would turnover backwards around its rear axle. To prevent this, Ferguson employed a brace between the tractor and implement, which is the upper link of the three-point hitch, now an industry standard.

In 1956, the Agricultural Tractor Test Code SAE 708c was approved and specifies in part, that for drawbar performance tests, maximum permissible slippage for tractors equipped with steel lugs is 7 percent. For tractors with pneumatic tires, 15 percent slippage is allowed, manifesting the difference in soil strength of sub-surface layer versus that of the surface soil.

In 1938, the SAE Cooperative Tractor Tire Test Committee concluded after extensive field tests that "The most important factor affecting drawbar performance is the soil itself." In 1978, Canadian researchers, in ASAE paper 77-1053, found that the conclusions of 40 years earlier by the above referenced Test Committee still stand.

Soil thrust is defined as the horizontal reaction produced by the ground when it is deformed by a vehicle wheel, and is generated by slippage of same. The associated shear action is resisted by soil strength, which provides the thrust necessary for propulsion. The maximum force required to shear the soil along the ground-contact area of a wheel, or the maximum thrust the soil can develop, is expressed with the equation:

$$T_{max} = W \times (C/P + \tan \phi) \text{ lb},$$

where two terms are vehicle-dependent:
  W = weight carried by driving wheels; lb;
  P = W/A ground pressure, where A is ground contact area; sq. in. and,
two terms are soil-dependent:
  C = Coeff of soil cohesion; psi
  $\phi$ = angle of soil internal friction, deg.

From this it is clear that the amount of maximum soil thrust, equivalent to static drawbar pull, may be increased by adding weight (W) and ground contact area (A) in the form of ballast and oversize or dual tires, respectively. However, such measures will not improve the efficiency of transmitting power to the implement, as a wheel—comprising a pneumatic tire—interfaces with surface soil only.

In regard to developing thrust, soil-strata behave much like metals. As the rate of elongation in steel is only a third of that in aluminum to produce the same pull, the rate of deformation in sub-surface soil is less of that in surface soil to produce the same thrust. The difference in rates, is in accordance with their respective modulus. As experience has taught, soil becomes harder to deform as the depth from surface is increased. A lower rate of deformation corresponds to a lower rate of wheel slippage required for developing the same thrust.

Thus, to reduce the rate of wheel slippage, or reduce the loss in travel speed due to it, the characteristics of the stronger sub-surface soil must be utilized. With the need for movement on paved roads and utility, the pneumatic tire is still the preferred solution. The present invention overcomes its two serious shortcomings by employing a conveniently usable safe and lightweight accessory to obtain the advantages of a steel wheel without the disadvantages discussed above.

SUMMARY OF THE INVENTION

It is therefore an object of this invention to improve traction efficiency for rubber tired vehicles.

It is another object to provide an accessory for rubber tired vehicles, capable of functioning with equal traction efficiency as tractors equipped with steel wheels.

It is an object to provide traction enhancing means by providing resilient traction bars in a configuration which essentially follow the contour of a driving tire.

Still another object of the invention is to provide amplifying devices to obtain additional versatility and utility.

A further object is to improve on traction intensifying means by employing strong and lightweight materials.

Yet another object of the invention is to provide means for easy installation and removal of the device onto and from a tire.

Still another object of the invention is to improve on traction intensifying means by making them easily adjustable to fit tightly upon various size tires.

DESCRIPTION OF THE DRAWINGS

Further objects of the invention together with additional features contributing thereto and advantages accruing therefrom, will be apparent from the following description of the preferred embodiments of the invention, which are shown in the accompanying drawings with like reference numerals indicating corresponding parts throughout, wherein:

FIGS. 1a and 1b are schematic diagrams depicting compression springs as analogous to layers of soil;

FIG. 2 is a graph showing relationship of travel speed and loss of same at various rate of wheel slippage;

FIGS. 3a and 3b are side views of the traction intensifier installed on an agricultural tractor in one mode of application;

FIGS. 4a through 4c are views of the device as installed in semi-full complement arrangement and employing amplifying means;

FIGS. 5a and 5b are side views of the device as used in full complement and with amplifying means;

FIGS. 6a through 6d show the invention in configuration as employed for passenger cars, pick-up trucks and the like.

DESCRIPTION OF THE PREFERRED EMBODIMENTS

Referring now to FIG. 1a and FIG. 1b, there is shown an analogy between soil layers and mechanical equivalents of same, for purpose of illustrating the need for deformation and wheel slippage in developing thrust for propulsion. Here, the surface soil and the sub-surface soil are likened to two horizontal compression springs; an upper with a lower spring rate of k' pounds per inch, and a lower with a higher spring rate, k" pounds per inch. FIG. 1a simulates a pneumatic tire; FIG. 1b simulates a wheel with steel lugs of early tractors. Tractive effort provided by a tractor is represented by pushing on a bar with force Q against axle A, connected with a weight P.

In FIG. 1a, the bar is capable of reaching the upper, and weaker, spring only. In FIG. 1b, the bar is longer at the ground and thus capable of reaching the lower, and stronger, spring as well. The graph below each FIG. shows the relationship between the force, $F_1$ produced by the springs, as a function of distance of deformation.

As shown in FIG. 1a, spring k' must be compressed a distance La equal to P/k' inches, before weight P begins to leave the ground. As shown in FIG. 1b, the springs k' and k" need to be compressed only a distance Lb, equal to (P/(k'+k")) inches, before weight P begins to leave the ground. As a representative numerical example, if k' is 10 lb/inch, k" is 20 lb/inch and weight P is 30 lb, then the distance La is 30/10=3 inches, whereas distance Lb of only 30/(10+20)=1 inch is needed to move the weight P. The difference between the distances La and Lb represents the difference in the corresponding rate of wheel slippage required to develop same drawbar pull on a tractor.

FIG. 2 shows the effect of such difference in rate of wheel slippage in terms of loss in tractor travel speed under drawbar load. The sectioned portion of the graph is the range of 10 to 14% slippage recommended by tire manufacturers for 2-wheel drive tractors (it is 8 to 12% for 4-wheel drive tractors). The upper and lower sloping lines are the maximum permissible rates of wheel/track slippage specified in SAE Standard 708c, Agricultural Tractor Test Code, of 15 and 7 percent respectively. From definition of slippage given in this Code, it can be deduced that the loss in travel speed, due to slippage is as follows:

$$mph - MPH = MPH \times s/(1-s) \text{ m/h,}$$

where
  mph = travel speed under no-load;
  MPH = travel speed under load;
  s = wheel or track slippage, in fraction;

As per Nebraska Tractor Test Data, the average travel speed during drawbar performance tests at 100% load is about 5 miles per hour. From the equation above, the loss in travel speed is then: $5 \times (0.15/(1-0.15)) = 0.88$ miles per hour at maximum permissible wheel slippage, as is shown in FIG. 2. Conversely, at the 7% maximum allowed for tractors with steel lugs, the speed loss would have been: $5 \times (0.07/(1-0.07)) = 0.38$ miles per hour. Hence, had the tractors been equipped with steel lugs, they would have traveled 0.5 miles per hour faster at some drawbar pull, and for same number of wheel revolutions or at a speed of 5.50 miles per hour equalling a 10% increase in productivity—this gain stemming from the reasons as explained in FIGS. 1a and 1b.

Also, the earlier equation from soil mechanics provides for a comparative analysis to equate the amount of ballast with higher soil values needed. If amount Q pounds of ballast is added to the driving wheels, then the expression becomes:

$$T_{max} = (W+Q) \times [C \times A/(W+Q) + \tan \phi] \text{ lb.}$$

To increase thrust by penetrating means for reaching higher soil values:

$$T'_{max} = W \times [C \times X \times A/W + \tan(\phi \times Y)] \text{ lb.,}$$

where X and Y denote percentage increase in the C and $\phi$, respectively.

To equate ballast Q with factors X and Y, $T'_{max}$ must equal $T''_{max}$. From these expressions and solving for Q, gives the corresponding amount of ballast, Q, required:

$$Q = 1/\tan \phi \times [A \times C \times (X-1) + W \times [\tan \phi \times Y) - \tan \phi]] \text{ lb.}$$

To illustrate magnitude of Q, a representative example as follows: unballasted W=10,000 lb.; A=400 sq. in.; C=0.50 psi; $\phi$=25 deg. Further, say, subsurface soil has a 25% higher c-value, or x=1.25; and a 35% higher $\phi$-value, or Y=1.35. From this:

$$Q = 1/\tan 25 \times [400 \times 0.50 \times (1.25-1) + 10,000 \times [\tan(25 \times 1.35) - \tan 25]]$$

which gives: Q=4464 pounds of added weight. From the original equation, the same tractor gave, in its unballasted configuration, the maximum soil thrust:

$$T_{max} = 10,000 \times [0.50 \times 400/10,000 + \tan 25] = 4860$$
pounds of thrust.

And likewise with the above 4464 pounds of ballast added;

$$T_{max} = 14,464 \times [0.50 \times 400/14,464 + \tan 25] = 6,940$$
pounds of thrust.

Thus, the increase in thrust, due to the ballast: 6940−4860=2080 pounds. This results in an effectiveness for adding ballast of: 2080/4464×100=47%.

Nebraska Tractor Test Data provides information for computing the amount of fuel, consumed to provide "ballast-power". The ballast Q causes an added motion resistance of $R_m = r \times Q$ pounds, where r is specific rolling resistance. The power required to haul ballast Q at a speed of V miles per hour, is:

$$HP = (r \times Q \times V)/375 \text{ horse power};$$

The corresponding amount of fuel consumed, is:

$$F_h = f_s \times (r \times Q \times V)/375 \text{ gallons per hour},$$

where $f_s$ is specific fuel consumption in gallons per hour per horsepower.

Per Nebraska Test Data, on drawbar performance at 100% load, the average travel speed, V, is 5.14 miles per hour and the average consumption, $f_s$, is 0.079 gallons/hp hr. Rolling resistance for farm tractors may vary from 0.025 to 0.300; say here, r=0.150 as a realistic average. Then, hourly fuel consumption for hauling the 4464 pounds of ballast, in the example, is:

$$F_h = 0.079 \times (0.150 \times 4464 \times 5.14)/375 = 0.73 \text{ gallons per hour}$$

resulting in an annual consumption of 365 gallons during 500 hours usage per year. This corresponds to over 50 million BTUs of energy at 140,000 BTU per gallon of diesel fuel, for each tractor yearly.

The numerical values in the example above represent a realistic situation and in the foregoing analysis it is shown that a traction intensifying device—capable of penetrating into sub-surface soil having 25 and 35% higher C and φ value than those of the surface soil—can provide not only equal amounts of improvement in static drawbar pull as can a ballast of over 4400 pounds weight, but it will also transmit propulsion power at a significantly lower rate of wheel slippage and, most notably, without waste in energy by the tractor's engine.

FIGS. 3, 4 and 5 show the invention in three different embodiments. FIGS. 3a, 4a and 5a is the main assembly 10, comprising a traction bar 11, two longer belts 12 and two shorter belts 14, each of the four belts secured to the outer edges of the traction bar 11 as shown. Here the traction bar 11 is made from the casing of a truck or bus tire, which has been cut transversely into a radial segment. For use on particularly large agricultural tires, the segment is made from wide base type truck or bus tire. Use of this embodiment has several advantages. It provides "bite" and "bulk" which are essential characteristics, and it will essentially follow the contour of a driving tire; is inherently strong and resilient; provides retainment for amplifying devices; has low weight; is easy to manufacture; is readily available at low cost; and cannot rust.

Belts 12 and 14 are of aircraft quality cambuckle type seat belt webbing, of minimum breaking strength of 8000 pounds and here threaded through holes 21 and assembled to the traction bar 11 by sewing. The shorter belts 14, each have a cam buckle 13 sewn onto one end. The cam buckle type is preferred, since it facilitates expeditious and effortless removal of the intensifier even after it has been subjected to great strain. The free ends of the longer belts 12, each has a hole 15, to provide for quick and convenient installation. Each belt 12 has sufficient length to accomodate largest size tire 16 as intended to serve. FIG. 3b shows an arrangement wherein four assemblies 10 are installed upon a tire 16. For easy installation, a springwire 16a, as shown in FIG. 6a, is threaded from outside of wheel disc 17, thru an opening 17a, hooked onto the hole 15 of both belts 12 and pulled back. A protector 18, is used to assure that the strength of the belts 12 will not be impaired in usage. Fastening belts 12 to buckles 13 will hold the traction bar 11 securely upon the tire 16.

FIG. 4b shows a semi-full complement arrangement, wherein the four assemblies 10 are connected to four traction bars 19, by means of eight belts 20. Traction bar 19 is identical to segment 11 and the two belts 20, are merely threaded through the holes 21 and 19 as shown. A loop-like belt 22, having cam buckles 23 at each end, is threaded over each of the two belts 14 and 12 as shown in FIG. 4c. To secure traction bars 19 to tire 16, each end of belts 20 is thus connected to traction bars 11 by means of buckles 23. Belts 20 and belts 22 are of the same material as belts 12 and 14. Buckles 23 are of same type as are buckles 13. Belts 20 are of sufficient length to accomodate largest size tire 16 as intended to serve. To fit smaller size tire 16, belts 12 and 20 are merely pulled up accordingly; regular loops are provided so that excess length is here folded orderly.

FIG. 5b shows a full complement arrangement with identical components as in the semi-full arrangement. The only difference being that larger number of traction bars 19 are required; and here the belts 20 are threaded through holes 21 so that traction bars 19 are close together. The largest number of traction bars 19 is essentially equal to that which is required to nearly fill the entire circumference of the largest size tire 16 intended to serve. For smaller sizes of tire 16 fewer traction bars 19 are required.

With tire 16 in full complement arrangement, it is essentially covered with an outer shell of increased ground contact area and thus better floatation has been achieved, but obviously no increased intensification of traction. Thus in full complement arrangement, additional means must be introduced to attain the object of the invention. Therefore, a spud 24 as shown in FIG. 5a, and also in FIG. 4a, is placed between tire 16 and traction bars 11 and 19 shown in FIG. 5b and also in FIG. 4b. It is made of thin guage spring steel or of a super strength, low carbon sheet steel with tradename MartINsite made by Inland Steel of Chicago which has a tensile strength of 190,000 psi. It extends along the width of traction bars 11 and 19. The total thickness of its biting edge 25, which penetrates into the sub-surface soil, is designed to withstand the maximum propelling force made available at the outer periphery of tire 16, by the tractor without permanent bending or breakage.

Spud 24, an auxiliary traction enhancing means, is here the element that replaces the need for a steel lug, used on early agricultural tractors. As applied in this invention, the spud 24 has a number of advantages. First, it need not be bolted or welded onto a steel rim as the lug on earlier tractors. Instead, spud 24 is securely held in place, by means of a support portion or shank 26 of it as it is pressed between inner surface of traction bars 11 and 19 and the outer periphery of tire 16. Also, the working part of it, edge 25, is forced by propulsion resistance against the substantial transverse edge of traction bars 11 and 19 having a thickness in excess of one inch. The steel lugs used on earlier tractors were narrow in width, whereas spud 24 extends along the entire width of tire 16 and thus develops an equal amount of soil thrust although the spud needs not penetrate as deeply into sub-surface soil as would be required by steel lugs.

Although the Figures slow the biting edge 25 of spud 24 to form right angle with its shank 26, in an alternative construction, this angle is less than 90 degrees. The shown configuration functions like a grouser shoe on a track-type vehicle, whereas with less than 90 degrees it functions in principle like a steel lug on earlier tractor, by which a self-cleaning effect is achieved.

Additional traction intensifying may be desired in special situation or applications, such as in rice and cane fields. FIG. 4a shows an amplifier block 27, comprising a narrow segment made from a smaller tire. As shown, it is merely placed over the shank of spud 24 and in operation is firmly secured by wedge action upon it. As illustrated in FIG. 4b, the block 27 causes the traction bars 11 and 19 to be held in wedge-like position, whereby the thrusting edge of the assembly has been further increased. It should be noted that for the same conditions and configurations of traction intensifer, an equal amount of improvement in static drawbar pull is attained whether the driving wheels are equipped with four, eight or full complement of assemblies, as shown in FIGS. 3b, 4b and 5b respectively. The difference shows up in dynamic drawbar performance and so because of different rate of slippage.

During heavy drawbar work an arrangement as in FIG. 3b results in greater slippage per wheel revolution than with an arrangement as in FIG. 4b for same diameter of tire 16; likewise, the lowest rate of slippage, and thus the greatest productivity gain, is achieved with the full complement arrangement as shown in FIG. 5b.

In this arrangement—and used for example on a 18.4-34 agricultural tire, some twenty assemblies 10 and 19 are required for essentially covering the circumference which is approximately 180 inches. Each pair of assemblies 10 and 19 weigh about fifteen pounds, for a total weight of 150 pounds per wheel. For a smaller tractor, the number of assemblies 10 and 19 would naturally be lower. Likewise, the spud 24 of thin guage sheet steel is used in singles, duals or multiples and merely placed upon each other with the number of spuds required depending on tractor size.

The heavier the tractor the more tractive effort it can make available at the ground, and thus the higher force is developed at the biting edge 25 of spud 24. By using two or more spuds 24, placed upon each other, and thus acting like a series of leaf springs, the bending stress on the spud 24 is being held within safe elastic and fatigue limit. For a tractor with 18.4-34 driving tires, the spud weighs less than two pounds, for a total of less than forty pounds per wheel.

Thus, the total weight of the traction intensifying means for this relatively large tire, is less than 200 pounds per wheel or less than 400 pounds per pair of driving wheels which is only some ten percent of the typical 4000 pounds of ballast weight.

In arrangement as per FIG. 5b, but without spuds 24 installed, a tractor is driven with comfort on paved roadways. As a field is reached, the operator simply unbuckles one set of the buckles 23 for each of the four strings of assembly 19, and slips on the spud 24 for each traction bar 11 and 19. For each assembly 10, the two buckles 13 are loosened and spud 24 for traction bar 11 of it is slipped on; when returning from the field, the procedure is reversed, and the spuds are removed with ease.

The same concept as had been described in the foregoing is employed also for driving tires for cars, pick-up trucks, vans and campers. FIG. 6a shows one embodiment for this application. Here, the main assembly 10a consists of a traction bar 11a, the longer belt 12a and the shorter belt 14a and cam buckle 13a. Each of the two belts and buckle 13a are secured to the edges of the traction bar 11a as shown. Traction bar 11a is made from the casing of a passenger car tire, and here the belts 12a and 14a are secured to it by means of sewing and stitched in multiple passes with heavy duty industrial thread. In an alternative configuration, not shown, the belt 14a is omitted. Instead belt 12a extends along the inside contour of traction bar 11a and around the buckle 13a as in the shown embodiment. In both embodiments, belt 12a has a hole 15a at its free end. A spring wire 16 is used in the same manner as described for providing quick and easy installation.

The traction intensifier as installed is shown in FIG. 6b. It can be used singly as shown, in duals, or in multiples for each driving wheel. FIG. 6c shows the assembly 10a as equipped with a spud 28. FIG. 6d shows another embodiment of spud, identified by numeral 29.

Both spuds 28 and 29 are made of the same material as is spud 24, but here u-shaped so as to straddle the segment 11a. In use, spuds 28 and 29 are held firmly in place by pressure imposed upon it by the segment 11a and both provide extra traction while driving on icy surfaces, as the biting edge 30 penetrates into such. As configuration of spud 29 provides a substantial width of biting edge, and area of ground contact outside the width of tire footprint, this alternative is used on non-steering driving wheels on vehicles where mobility in severe terrain is desired. Although not shown in the figures, it is understood that the concept and design lends itself well not only to vehicles having single driving tires, but also those with dual tires, including off the road trucks, log skidders and the like.

Further, while the invention has been described in detail with reference to preferred embodiments, it will be understood by those skilled in the art that various changes made be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but the invention will include all embodiments falling within the scope of the appended claims.

What is claimed is:

1. Traction intensifying means for a rubber tired vehicle having a power driven drive wheel comprising
a resilient traction bar formed from substantially U-shaped cross section segments of a tire casing having a tread pattern with the configuration of the outer surface-engaging base portion of the U-shaped segment being positioned in use parallel to the outer transverse contour of a vehicle drive wheel, and the substantially parallel portions of said U-shaped segments extending radially outwardly from said base portion being positioned in use parallel to the sidewalls of the vehicle drive wheel, at least a first belt secured at one end to one of said substantially parallel portions of said U-shaped segment extending radially outwardly from said base portion and having a free end for engaging a cam buckle fastener, at least a second belt secured at one end to an opposed one of said parallel portions of said U-shaped segment extending radially outwardly from said base portion and having a cam buckle fastener secured to the end thereof for engagement with said free end of said first belt for securing said resilient traction bar to the vehicle drive wheel, and auxiliary traction enhancing means carried by said resilient traction bar including a shank portion positioned between the outer transverse contour of the vehicle drive wheel and an inner surface of the base portion of said substantially U-shaped cross section segment of tire casing for securing said auxiliary traction enhancing means in use between said resilient traction bar and the vehicle drive wheel, said auxiliary traction enhancing means further including a radially outwardly extending ground engaging edge portion extending from said shank portion across substantially the transverse width of the vehicle drive wheel.

2. The traction intensifying means of claim 1 further including at least two pair of belts secured to said resilient traction bar and operatively engaged by means of a releasable cam buckle mechanism for securing said traction intensifying means thereto.

3. The traction intensifying means of claim 2, wherein said pair of belts includes means to facilitate expeditious installation onto a power driven drive wheel.

4. The traction intensifying means for a rubber tired vehicle as defined in claim 1 comprising two or more traction intensifying means to develop a greater amount of soil thrust at a lower rate of wheel slippage.

5. The traction intensifying means of claim 4 wherein said traction intensifying means include means releasably securing said resilient traction bars to each other.

6. The traction intensifier of claim 1 wherein said auxiliary traction enhancing means includes a transversely extending ground engaging edge portion extending radially outwardly from said shank portion adjacent to both sides of said base portion of said U-shaped cross section segment of a tire casing.

7. The traction intensifier of claim 6 wherein said shank portion of said auxiliary traction enhancing means is formed with at least two openings therein through which said substantially parallel radially outwardly extending portions of said U-shaped tire casing segment having said first and second belt secured thereto are passed through for securing said auxiliary traction intensifying means to the vehicle drive wheel.

* * * * *